(12) United States Patent
Yu

(10) Patent No.: US 9,573,609 B2
(45) Date of Patent: Feb. 21, 2017

(54) PICKING LADDER CART

(71) Applicant: ROMP ENTERPRISE CO., LTD., Taichung (TW)

(72) Inventor: Chang-Yi Yu, Nantou County (TW)

(73) Assignee: ROMP ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 14/957,960

(22) Filed: Dec. 3, 2015

(65) Prior Publication Data
US 2016/0160561 A1 Jun. 9, 2016

(30) Foreign Application Priority Data

Dec. 3, 2014 (TW) .............................. 103221417 U

(51) Int. Cl.
*B62B 3/02* (2006.01)
*E06C 7/02* (2006.01)
*B62B 3/10* (2006.01)
*E06C 7/16* (2006.01)
*E06C 5/02* (2006.01)
*E06C 1/39* (2006.01)
*E06C 1/397* (2006.01)
*E06C 7/18* (2006.01)

(52) U.S. Cl.
CPC .............. *B62B 3/022* (2013.01); *B62B 3/10* (2013.01); *E06C 1/39* (2013.01); *E06C 1/397* (2013.01); *E06C 5/02* (2013.01); *E06C 7/02* (2013.01); *E06C 7/16* (2013.01); *E06C 7/182* (2013.01)

(58) Field of Classification Search
CPC ............... E06C 5/02; E06C 7/02; E06C 7/16; E06C 1/397; E06C 1/38; B62B 3/10; B62B 3/022; B62B 3/02
USPC .................. 182/17, 15, 127; 11/17, 15, 127
See application file for complete search history.

(56) References Cited

U.S. PATENT DOCUMENTS

| 891,379 | A | * | 6/1908 | Scott | E06C 9/12 |
| | | | | | 182/17 |
| 1,439,388 | A | * | 12/1922 | Willett | E06C 1/393 |
| | | | | | 182/113 |
| 1,522,299 | A | * | 1/1925 | Hampton | F16D 53/00 |
| | | | | | 16/35 R |
| 1,701,951 | A | * | 2/1929 | Holt | B62B 5/049 |
| | | | | | 182/127 |
| 2,314,478 | A | * | 3/1943 | Brower | E06C 1/397 |
| | | | | | 16/44 |

(Continued)

*Primary Examiner* — Katherine Mitchell
*Assistant Examiner* — Marcus Menezes
(74) *Attorney, Agent, or Firm* — Ming Chow; Sinorica, LLC

(57) ABSTRACT

A picking ladder cart with a synchronized brake is provided, which includes a frame, a plurality of wheels, a ladder, and a stopper. The ladder is pivotally connected to a side of the frame, wherein the ladder is pivotally movable between a first position and a second position. The ladder includes two side rails and a plurality of steps, which are connected between the two side rails. The stopper has a first end and, a second end. When the ladder is moved to the second position, one of the plurality of steps, which is arranged at the lowest position among the steps, abuts against the second end of the stopper, which causes the stopper to contact one of the wheels. When an operator steps on the ladder of the picking ladder cart, the lowest step drives the stopper to abut against one of the wheels.

5 Claims, 4 Drawing Sheets

(56) References Cited

U.S. PATENT DOCUMENTS

| | | | | |
|---|---|---|---|---|
| 2,572,548 A * | 10/1951 | Weisz | ............... | F16D 49/00 16/35 R |
| 2,707,585 A * | 5/1955 | Hoey | ............... | B62B 3/00 182/127 |
| 2,709,827 A * | 6/1955 | Volz | ............... | B60B 33/045 16/33 |
| 2,827,215 A * | 3/1958 | Burg | ............... | B62B 5/00 182/15 |
| 2,899,010 A * | 8/1959 | Ledgerwood | ............... | B62B 5/049 182/106 |
| 3,020,972 A * | 2/1962 | Hockett | ............... | B62B 3/00 182/120 |
| 3,026,960 A * | 3/1962 | Koutnik | ............... | E06C 1/397 182/15 |
| 3,066,764 A * | 12/1962 | Kramesak, Jr. | ............... | B60B 33/021 16/35 R |
| 3,283,851 A * | 11/1966 | Smith | ............... | E06C 1/397 182/15 |
| 3,312,305 A * | 4/1967 | Waun | ............... | E04G 1/34 182/113 |
| 3,556,248 A * | 1/1971 | Adolphas | ............... | E06C 5/02 182/15 |
| 3,641,619 A * | 2/1972 | Roylance | ............... | E06C 1/397 182/127 |
| 4,174,021 A * | 11/1979 | Barlock | ............... | B62B 5/00 182/127 |
| 4,652,003 A * | 3/1987 | Karashima | ............... | B62B 5/00 182/127 |
| 5,236,066 A * | 8/1993 | O'Neal | ............... | B60B 33/0078 16/35 R |
| 5,653,307 A * | 8/1997 | Kerr | ............... | E06C 9/12 182/15 |
| 5,941,341 A * | 8/1999 | Gillis | ............... | E06C 1/39 182/15 |
| 6,523,640 B1 * | 2/2003 | Young | ............... | E04G 1/24 182/15 |
| 6,715,979 B1 * | 4/2004 | Theising | ............... | A47B 91/002 248/647 |
| 6,782,976 B2 * | 8/2004 | Hewitt | ............... | B62B 5/04 188/19 |
| 7,828,115 B2 * | 11/2010 | Sayles | ............... | E06C 1/39 182/15 |
| 7,841,447 B2 * | 11/2010 | Frame | ............... | E06C 1/387 182/15 |
| 2003/0209385 A1 * | 11/2003 | Kuehl | ............... | E06C 1/397 182/17 |

* cited by examiner

PICKING LADDER CART

BACKGROUND OF THE INVENTION

1. Technical Field

The present invention relates generally to a conveying appliance used for warehousing, and more particularly to a picking ladder cart with a synchronized brake.

2. Description of Related Art

In storage spaces such as warehouses, materials and goods are stocked on the shelves in different categories. For the convenience of conveying, picking ladder carts are commonly used in moving the materials and goods to and from the shelves.

A conventional picking ladder cart includes at least one brake installed on wheels. An operator has to depress the brake pedal to stop the wheel before stepping on a ladder of the picking ladder cart, and has to release the brake to make the wheel able to roll before pushing and moving the picking ladder cart. Although such steps can ensure the safety during operation, it requires more operational procedures, and therefore reduces the working efficiency.

In light of this, the applicant of the present invention has developed a picking ladder cart with a brake structure which enables operators to conveniently brake the cart. In more details, Taiwan patent M483214 discloses the brake structure of the picking ladder cart; said brake structure includes an interlocking structure and a stopper to brake the picking ladder cart as a ladder thereof is unfold. The steps of depressing and releasing the brake are omitted with such design, which increases the working efficiency. However, the applicant still devotes himself to develop a cost-effective picking ladder cart which provides the same function.

BRIEF SUMMARY OF THE INVENTION

In view of the above, the primary objective of the present invention is to provide a picking ladder cart with a synchronized brake, which is not only able to be easily braked but also cost-effective.

The present invention provides a picking ladder cart with a synchronized brake, which includes a frame, a plurality of wheels, a ladder, and a stopper. The plurality of wheels are installed at a bottom of the frame, which makes the picking ladder cart movable on a flat surface. The ladder is pivotally connected to a side of the frame, wherein the ladder is pivotally movable between a first position and a second position. The ladder includes two side rails and a plurality of steps which are connected between the two side rails. The two side rails are close to the frame when the ladder is moved to the first position, and are moved away from the frame when the ladder is moved to the second position. The stopper is provided at the bottom of the frame, which has a first end and a second end, wherein the first end is connected to the bottom of the frame, and the second end is close to the ladder. Whereby, when the ladder is moved to the second position, one of the plurality of steps which is arranged at the lowest position among the steps abuts against the second end of the stopper, which makes a middle part of the stopper contact one of the wheels.

Whereby, when an operator steps on the ladder of the picking ladder cart, the lowest step drives the stopper to abut against and stop the wheels, which increases the working efficiency.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
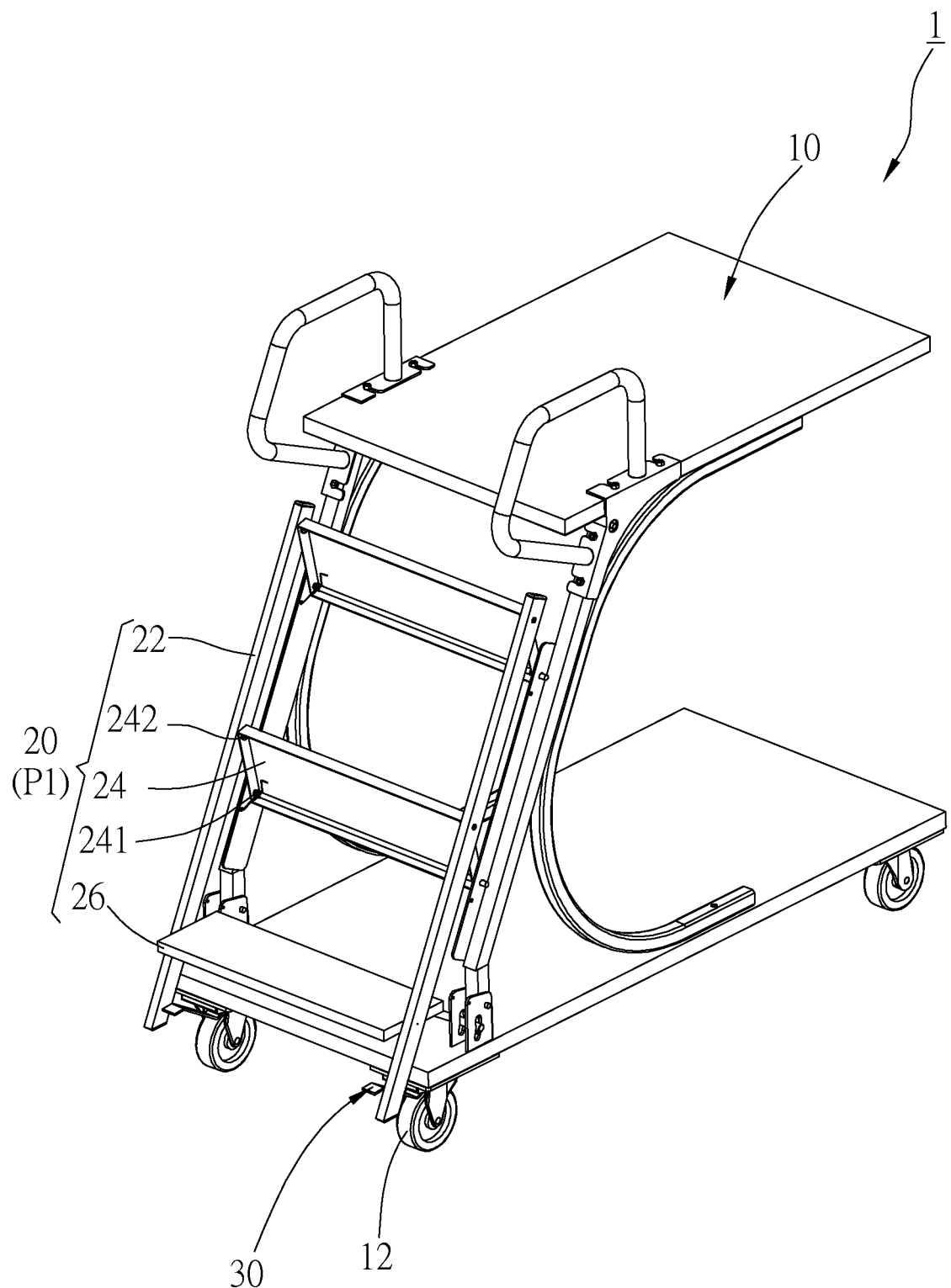
FIG. 1 is a perspective view of a preferred embodiment of the present invention, showing the picking ladder cart with a synchronized brake.
Figure 2:
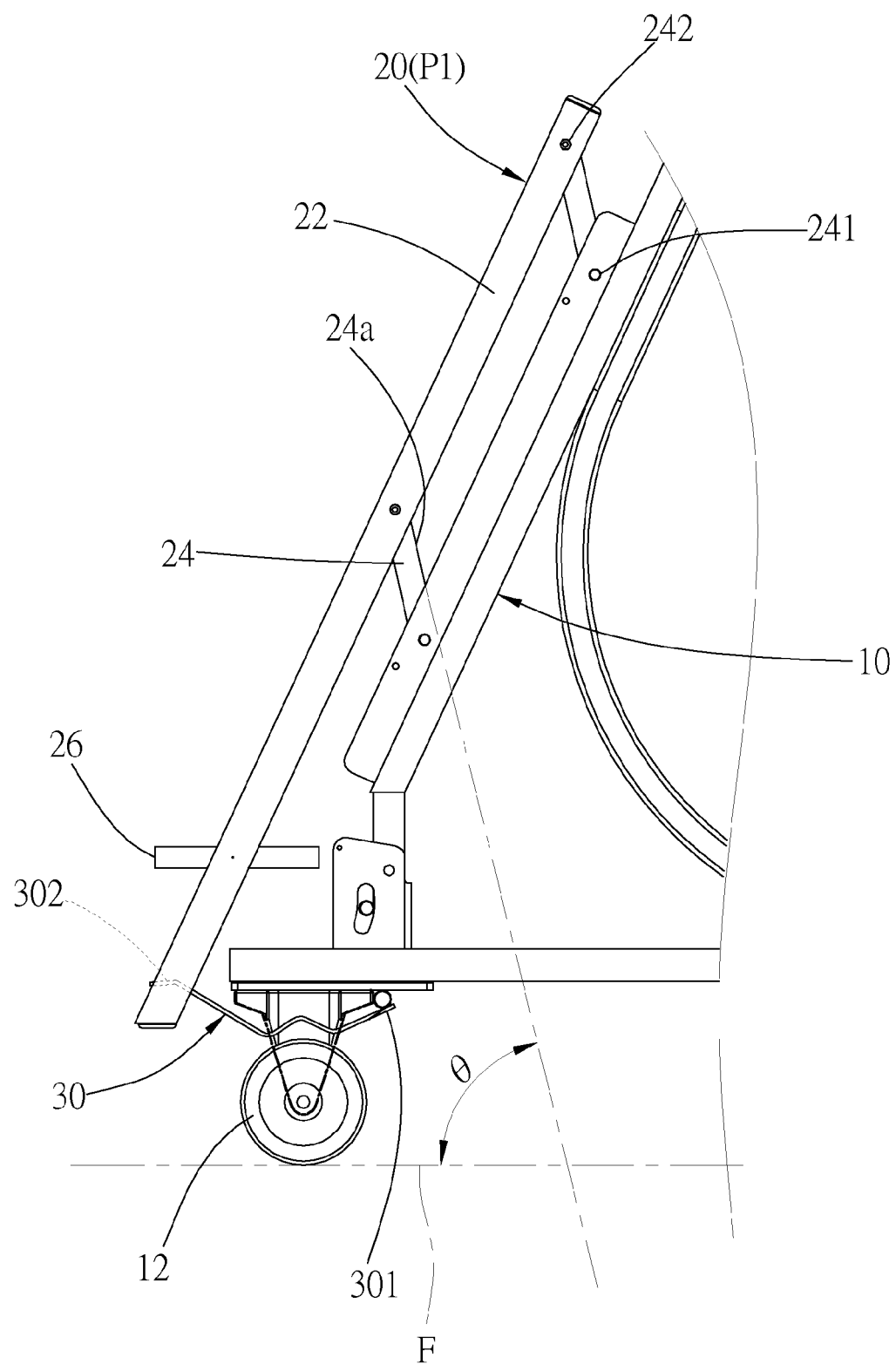
FIG. 2 is a partial lateral view of the preferred embodiment, showing the stopper having no contact with the wheel when the ladder is moved to the first position.

As shown in FIG. 1 and FIG. 2, a picking ladder cart 1 of the preferred embodiment of the present invention includes a frame 10, a plurality of wheels 12, a ladder 20, and a stopper 30. The plurality of wheels 12 are installed at a bottom of the frame, which makes the picking ladder cart 1 movable on a flat surface F.

The ladder 20 is pivotally connected to a side of the frame 10, and is pivotally movable between a first position P1 and a second position P2. The ladder 20 includes two side rails 22 and a plurality of steps, wherein the steps are arranged with intervals formed between two of the steps, and are connected between the two side rails 22. In the preferred embodiment, the steps includes two upper steps 24 and the lowest step 26, wherein each of the two upper steps 24 has a first pivoted end 241, a second pivoted end 242, and an upper surface 24a. The first pivoted end 241 is pivotally connected to the side of the frame 10, and the second pivoted end 242 is pivotally connected to one of the side rails 22. The two side rails 22 are connected to the frame 10 through the upper steps 24.

The lowest step 26 is fixed to the two side rails 22, and has an upper surface 26a for an operator to step on. As illustrated in FIG. 2, the two side rails 22 are close to the frame 10, and an included angle θ is formed between an extension direction of the upper surface 24a of each of the upper steps 24 and the flat surface F. In other words, the upper surface 24a is nonparallel to the flat surface F in this state, where the ladder 20 is in the first position P1.

Figure 3:
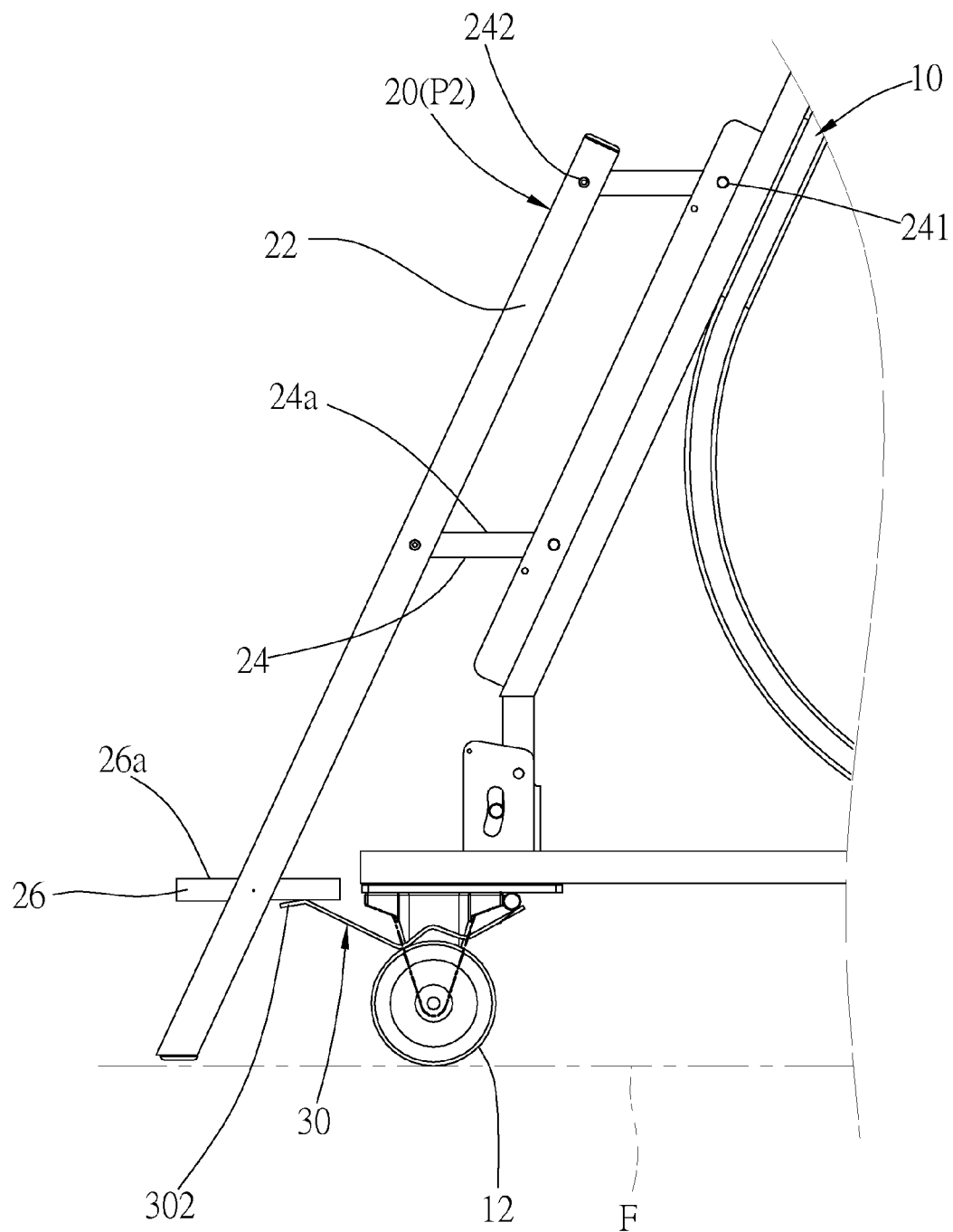
FIG. 3 is a partial lateral view of the preferred embodiment, showing the lowest step drives the stopper to abut against the wheel when the ladder is moved to the second position.

When the operator steps on the upper surface 26a of the lowest step 26, the two side rails 22 are moved down and away from the frame 10, and the two upper steps 24 are moved to a horizontal state as shown in FIG. 3. In this state, the upper surface 24a of each of the upper steps 24 is substantially parallel to the flat surface F, where the ladder 20 is in the second position P2. In this way, the operator can step on the two upper steps 24.

Additionally, the stopper 30 in the preferred embodiment is a curved rigid sheet, and has a first end 301 and a second end 302. The stopper 30 is provided between the bottom of the frame 10 and one of the wheels 12, wherein the first end 301 is connected to the bottom of the frame 10 through a spring seat 40. The second end 302 is exposed outside the orthogonal projection area of the frame 10, and is close to the ladder 20.

Figure 4:
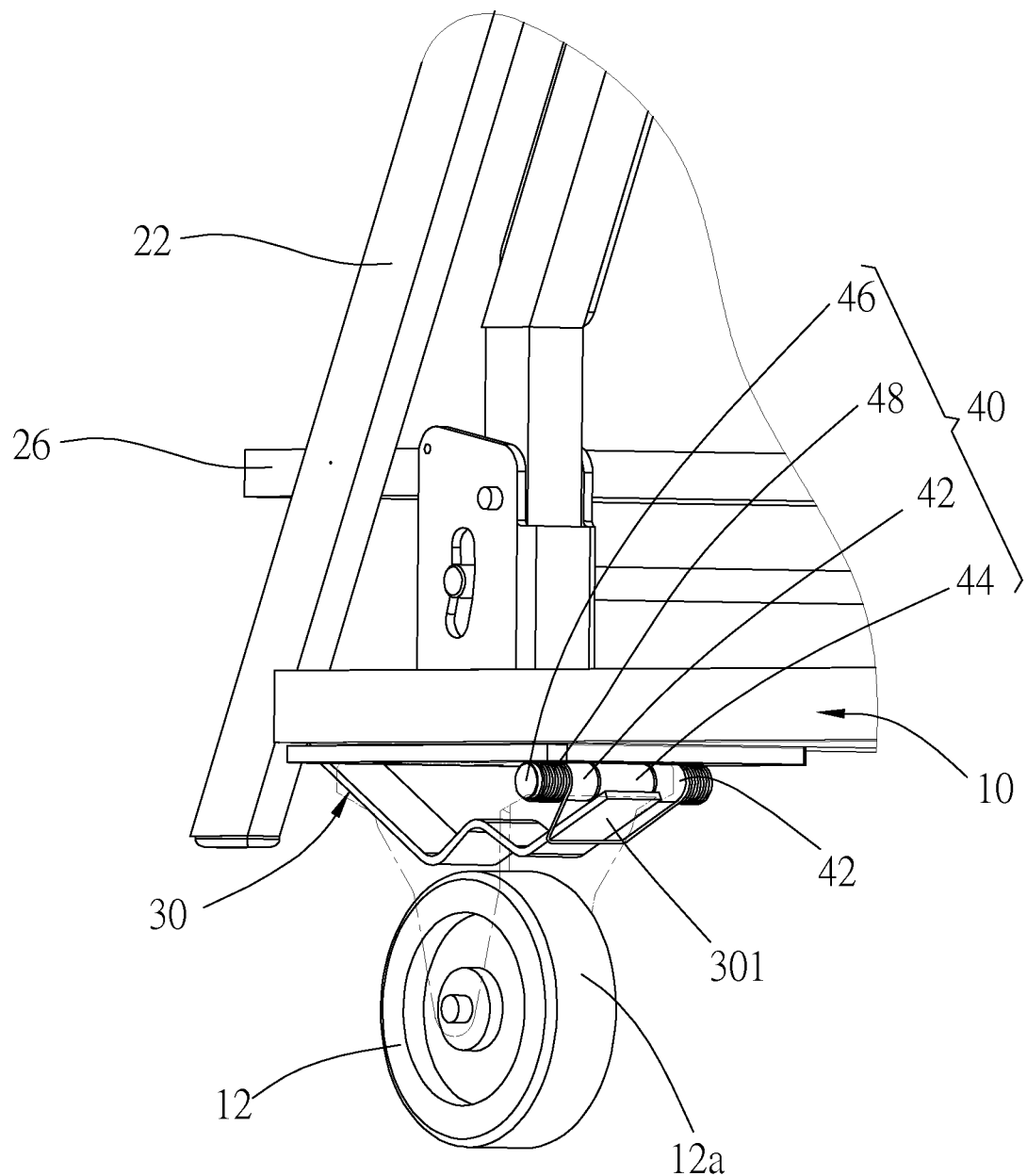
FIG. 4 is a partial enlarged view of the preferred embodiment, showing the first end of the stopper pivotally connected to the bottom of the frame.

In more details, the spring seat 40 depicted in FIG. 4 includes two shaft tubes 42, a sleeve 44, a shaft 46, and a flexible member, wherein the flexible member in the preferred embodiment is a torsion spring 48. The two shaft tubes 42 are fixed to the bottom of the frame, and are separated from each other. The sleeve 44 is provided between the two shaft tubes 42, and the shaft 46 passes through the two shaft tubes 42 and the sleeve. With such design, the sleeve 44 is rotatably installed at the bottom of the frame. The first end 301 of the stopper 30 is welded to the outer surface of the sleeve 44, and the stopper 30 is therefore pivotable on the shaft 46.

Two ends of the torsion spring 48 are twisted round the two shaft tubes 42 respectively to be supported for providing an upward force to the stopper through the middle section of the torsion spring 48. When the ladder 20 is moved to the first position P1 shown in FIG. 2, the stopper 30 has no contact with the lowest step 26 and the wheels 12.

On the other hand, when the operator would like to climb on the ladder 20, he or she has to step on and depress the lowest step 26 to drive the ladder 20 to move to the second position P2, which is illustrated in FIG. 3. In this state, the lowest step 26 abuts against the second end 302 of the stopper 30, and the wheel 12 is accordingly abutted by the middle section of the stopper 30, which stops the picking ladder cart 1.

It must be pointed out that the embodiment described above is only a preferred embodiment of the present invention. All equivalent structures which employ the concepts disclosed in this specification and the appended claims should fall within the scope of the present invention.

What is claimed is:

1. A picking ladder cart, comprising:
a frame;
a plurality of wheels installed at a bottom of the frame, which allows the picking ladder cart to be moved on a flat surface;
a ladder pivotally connected to a side of the frame, wherein the ladder is pivotally movable between a first position and a second position, and comprises of two side rails and a plurality of steps which are connected between the two side rails; the two side rails are adjacent to the frame when the ladder is moved to the first position; the two side rails are moved away from the frame when the ladder is moved to the second position; one of the plurality of steps, which is arranged at a lowest location among the plurality of steps is defined as a lowest step closest to the plurality of wheels;
a stopper provided at the bottom of the frame, which has a first end and a second end, wherein the first end is connected to the bottom of the frame, and the second end is adjacent to the ladder;
wherein the lowest step abuts against the second end of the stopper when the ladder is moved to the second position, which causes a middle part of the stopper to contact one of the plurality of wheels; and
the lowest step remains abutting against the second end when the ladder is in the second position, which prevents movement of the picking ladder cart along the flat surface.

2. The picking ladder cart of claim 1, wherein at least one of the steps has a first pivoted end, a second pivoted end, and an upper surface; the first pivoted end is pivotally connected to the side of the frame, and the second pivoted end is pivotally connected to one of the side rails; when the ladder is moved to the first position, an angle is formed between an extension direction of the upper surface and the flat surface; when the ladder is moved to the second position, the upper surface is substantially parallel to the flat surface.

3. The picking ladder cart of claim 1, wherein the lowest step is fixed to the two side rails, and has an upper surface; when the ladder is moved to the second position, the upper surface is substantially parallel to the flat surface.

4. The picking ladder cart of claim 1, further comprising a flexible member provide at the bottom of the frame, which gives an upward force to the stopper, wherein when the ladder is moved to the first position, the stopper has no contact with the lowest step and the plurality of wheels.

5. The picking ladder cart of claim 4, further comprising two shaft tubes, a sleeve, and a shaft, wherein the two shaft tubes are fixed to the bottom of the frame, and are separated from each other; the sleeve is provided between the two shaft tubes, and the shaft passes through the two shaft tubes and the sleeve; the stopper is fixed to an outer surface of the sleeve with the first end thereof, and is pivotable on the shaft; the flexible member comprises a torsion spring, which is supported by the two shaft tubes, and provides the upward force to the stopper.

* * * * *